United States Patent [19]

Mori et al.

[11] Patent Number: 4,573,053
[45] Date of Patent: Feb. 25, 1986

[54] AUTOMATIC DIRECTION FINDER

[75] Inventors: Kenzo Mori; Hyo Yasuda, both of Tokyo, Japan

[73] Assignee: Taiyo Musen Co., Ltd., Tokyo, Japan

[21] Appl. No.: 447,097

[22] Filed: Dec. 6, 1982

[30] Foreign Application Priority Data

Apr. 5, 1982 [JP] Japan .................................. 57-55362

[51] Int. Cl.⁴ .............................................. G01S 5/04
[52] U.S. Cl. ..................................... 343/441; 343/448
[58] Field of Search ............... 343/434, 435, 437, 440, 343/441, 448, 436, 429

[56] References Cited

U.S. PATENT DOCUMENTS

| | | | |
|---|---|---|---|
| 2,384,317 | 9/1945 | Lear | 343/448 X |
| 2,943,323 | 6/1960 | Ryan | 343/436 |
| 3,328,799 | 6/1967 | Green et al. | 343/429 |
| 3,553,699 | 1/1971 | Starley et al. | 343/440 X |
| 3,761,931 | 9/1973 | Hisatsu | 343/436 |
| 3,816,833 | 6/1974 | Ryan | 343/441 X |
| 3,967,280 | 6/1976 | Mayer et al. | 343/436 X |
| 4,302,759 | 11/1981 | Mori et al. | 343/436 |
| 4,306,240 | 12/1983 | Yasuda et al. | 343/440 X |
| 4,368,470 | 1/1983 | Mori et al. | 343/441 X |

Primary Examiner—Charles T. Jordan
Assistant Examiner—Brian S. Steinberger
Attorney, Agent, or Firm—A. W. Brenner

[57] ABSTRACT

An automatic direction finder capable of measuring a direction with a higher accuracy is disclosed. In an initial measurement, loop antennas and a vertical antenna are used in a conventional manner. However, in a final measurement the vertical antenna adversely affected by the surrounding disturbances is not employed and only the loop antennas are used. The disclosed finder includes a switching device for disconnecting the vertical antenna in the final measurement. The finder is also provided with a pair of search coils disposed perpendicular to each other. One of the search coils is connected to a combining circuit via the switching device, while the other is connected to the combining circuit via a balanced modulator.

4 Claims, 2 Drawing Figures

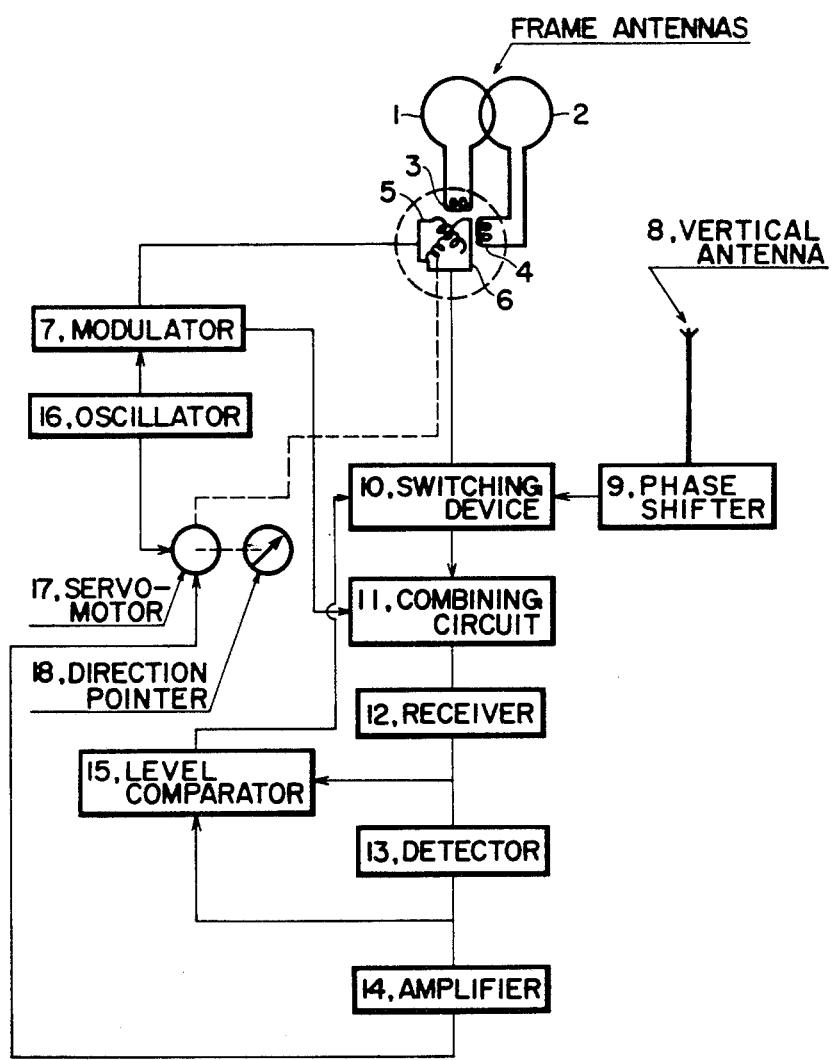
F I G. 1

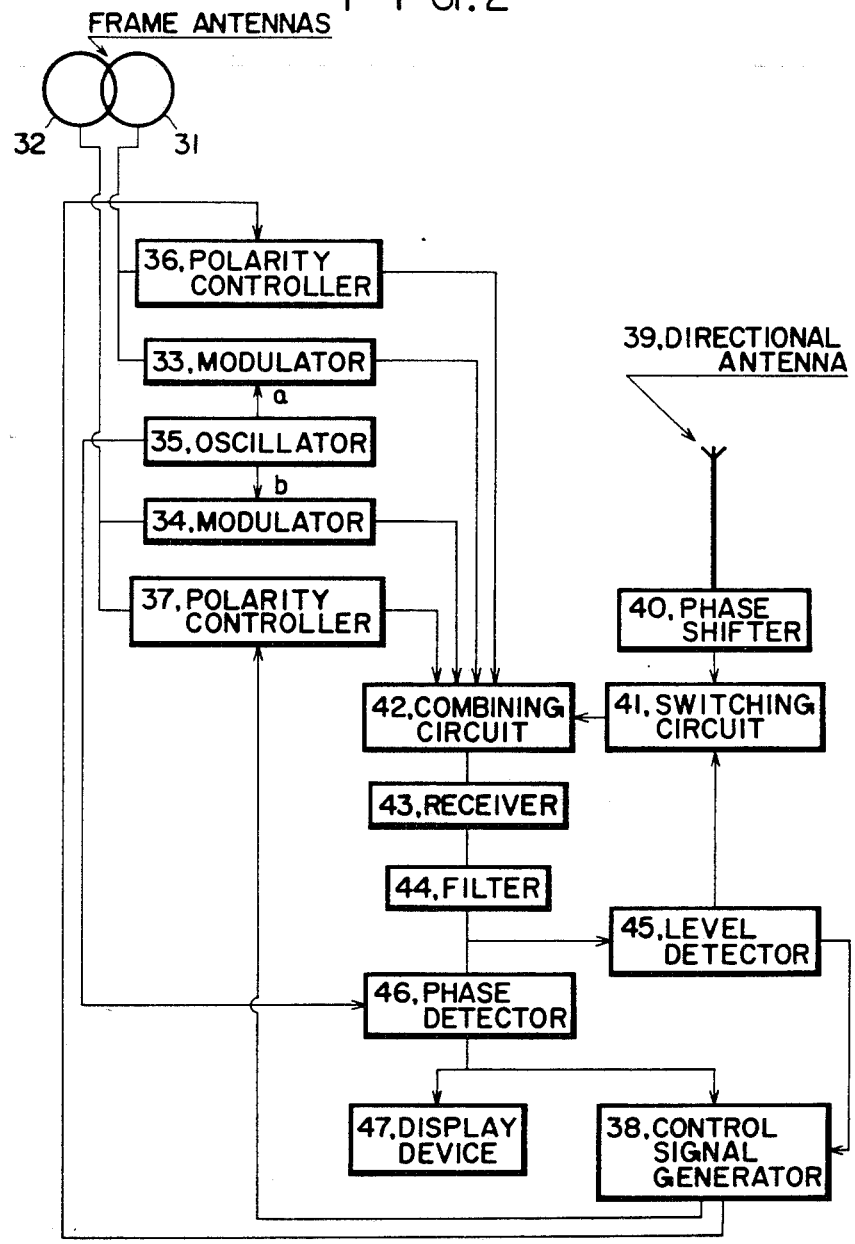

AUTOMATIC DIRECTION FINDER

FIELD OF THE INVENTION

The present invention relates to an automatic direction finder particularly for use on ships, vehicles, and aircraft.

BACKGROUND OF THE INVENTION

Automatic direction finders having a crossed-loop antenna circuit with a goniometer inserted into the circuit are known. The output from the goniometer is modulated with a low frequency signal, and the modulated signal is combined with the output from a vertical antenna in a 90° phase shift relation therewith. Thereafter, the resultant signal is amplified and detected by a receiver; the detected signal is fed to the driving winding of a servomotor, and at the same time the aforementioned low frequency signal for modulation is applied to the energizing winding of the servomotor which is mechanically coupled to the goniometer to indicate the direction of an incoming electromagnetic wave by the angular position of the pointer of the goniometer.

It is also known that a crossed-loop antenna produces two outputs each of which is modulated with a respective one of two low frequency signals that have the same frequency but are 90 degrees out of phase with each other, respective to one of a pair of modulators. The modulated signals and the output from a vertical antenna are all combined into a signal after the vertical antenna output is phase shifted by 90 degrees. The combined signal is then amplified and detected by a receiver. Thereafter it is passed through a filter which filters out all the frequency components except for the frequency for modulation. Then, the phase of the reference frequency signal for the aforementioned low frequency for modulation is compared with the phase of the output frequency from the filter to produce a phase difference angle signal which is employed to indicate the direction of a received electromagnetic wave.

The prior art direction finders as above defined have certain shortcomings. Specifically, if the aforesaid direction finders are installed on a ship or the like, there unavoidably exist many objects such as masts and stays near the antennas which will disturb electromagnetic waves. Particularly as a frequency to be measured becomes closer to the VHF band, high frequency groundings of a vertical antenna and the related elements employed for determining sensing become less stable; and, therefore, the amplitude and phase of a signal in the vertical antenna vary substantially with the direction of incoming electromagnetic waves as a result of being affected by masts and stays, thereby frequently obscuring the sensing and increasing error.

SUMMARY OF THE INVENTION

Accordingly, it is a primary object of the present invention to provide an automatic direction finder which is free of the difficulties described above. According to the present invention, the output from a vertical antenna is used together with the outputs from the loop antennas, as in the prior art apparatuses, in the initial measuring step. However, in the final step for indicating the measured angle, the direction of an incoming electromagnetic wave is measured without using any vertical antenna which has disadvantages in phase and amplitude. Other objects of the invention will appear from the following description.

BRIEF DESCRIPTION OF THE DRAWING

FIG. 1 is a diagrammatic view illustrating the construction of one embodiment of an automatic direction finder according to the invention; and FIG. 2 is a diagrammatic view illustrating the construction of another embodiment of an automatic direction finder according to the invention.

DETAILED DESCRIPTION OF THE INVENTION

Referring first to FIG. 1, one embodiment of the automatic direction finder of this invention includes loop antennas 1 and 2 which are so disposed that their directivities are orthogonal to each other; stator windings 3 and 4 which form a goniometer and are disposed perpendicular to each other; search coils 5 and 6 perpendicular to each other; a vertical antenna 8; 90° phase shifter 9, and a switching device 10 whose output will be applied to a combining circuit 11. Ordinarily, the output of the phase shifter 9 is connected to the combining circuit 11; but after completion of the initial measurement the phase shifter 9 is disconnected from the combining circuit 11 and the output of the search coil 6 will be connected to the combining circuit 11. The control signal for this operation is sent out from a level comparator 15 described hereinafter. The output of the combining circuit 11 is connected to a receiver 12. The finder further includes a detector 13 and a low frequency amplifier 14 whose output is connected to the driving winding of a servomotor 17, which in turn is mechanically coupled to the aforementioned goniometer. A direction pointer 18 is mechanically coupled to the servomotor 17. A low frequency oscillator 16 produces an AC signal of, for example, 135 Hz which is fed to the exciting winding of the servomotor 17. The output from the oscillator 16 is also applied to a balanced modulator 7 which is connected to the output side of the search coil 5 in the goniometer for modulation purposes. The output of the balanced modulator is connected to the combining circuit 11.

It is to be understood that if the search coil 6 were not used and if the phase shifter 9 were always connected to the combining circuit 11 by means of the switching device 10, the apparatus would be a known automatic direction finder. Therefore, it is not necessary to describe the principle on which the known part of the novel structure operates.

The aforementioned level comparator 15 compares the level of intermediate frequency of the receiver 12 with the level of a demodulated wave of detector 13; and, if the level of the intermediate frequency is zero or even if the intermediate frequency exist, the level of a frequency component of the demodulated wave having the same frequency as the output from the low frequency oscillator 16, exceeds a certain level, then the comparator will produce no control signal and cause the output from the phase shifter 9 to apply to the combining circuit 11. On the other hand, if the level of the intermediate frequency is more than zero and, at the same time, the level of the demodulated low frequency component is less than the certain level, then the level comparator 15 will apply a control signal to the switching device 10. As a result, the output from the phase shifter 9 is not transmitted, and instead of the phase shifter 9 the search coil 6 is connected to the combining circuit 11.

The switching operations and the initial and final measuring steps performed by the foregoing apparatus are as follows. When no electromagnetic wave is arriving, the level comparator 15 produces no control signal and the apparatus is waiting for arrival of a wave, as in the case of conventional automatic direction finders. When a signal wave is received, the output from the vertical antenna is transmitted to the combining circuit 11 via the phase shifter 9; and the output from the search coil 5 is also applied to the combining circuit but via the balanced modulator 7. The combined signal is then amplified by the receiver 12, and the detector 13 produces a signal which has the same frequency as the modulation frequency, such as 135 Hz. This signal is amplified by the amplifier 14 to rotate the servomotor 17, thus rotating the goniometer toward aural null direction. As the goniometer approaches the aural null, the output level of 135 Hz from the detector 13 decreases. This output level is detected by the level comparator 15; and, if it is less than a certain level indicating that the angular position lies within plus or minus 20°-30° from the aural null, then the initial measurement is completed. Then, the level comparator 15 produces a control signal which replaces the output from the phase shifter 9 with the output from the search coil 6, thereby allowing the final measurement, because the effect of the vertical antenna is avoided resulting in a direction measurement involving a smaller error. When no further wave is received, the level comparator 15 ceases to produce the control signal and the apparatus is restored to the initial measuring state where the vertical antenna 8 is used. It is to be noted that the present apparatus presents no difficulty in detecting an intermittent wave, such as a telegraph wave, if the level comparator 15 is so constructed as to have a suitable time constant.

With respect to the voltage of the signal derived from the search coil 6, the goniometer is in an aural null direction upon completion of the initial measurement and, accordingly, the search coil 6 is in a maximum sensitivity direction. Also, with respect to the phase of the signal from the search coil 6, the coils 5 and 6 are wound perpendicular to each other as fixed arrangement and so in the initial measurement the goniometer indicates the true bearing without 180° ambiguity even if the search coil 5 produces error. Further, as a natural consequence, this signal is derived in phase with the signal which is phase shifted from the vertical antenna output by 90 degrees.

Although in the embodiment described hereinbefore the output of the search coil 6 is connected to the combining circuit 11 via the switching device 10, the output of the search coil 6 may be permanently directly connected to the combining circuit 11 without going through the switching device 10. This alternative arrangement is not shown in the drawing, but the manner in which it operates will now be described in detail.

The output from the search coil 6 may be put in phase or out of phase with the output from the phase shifter 9 depending on its orientation with respect to the arriving direction of the wave, and the output voltage also varies. However, if the output from the phase shifter 9 exceeds the maximum output from the search coil 6 by a certain quantity in the initial measurement, then the phase of the output from the search coil 6 will be always in phase with the output from the phase shifter 9, irrespective of the angular position of the search coil relative to the arriving direction of the wave. Hence, in the initial measurement the same operations can be effected whether the search coil 6 is isolated or kept connected to the combining circuit. After completion of the initial measurement, the same final measurement is made as in the previous embodiment. Accordingly, such measurement will not be again described.

Referring now to FIG. 2, another embodiment of an automatic direction finder of this invention includes a pair of loop antennas 31 and 32 which are disposed perpendicular to each other. These antennas apply their outputs to balanced modulators 33 and 34, respectively. These signals are modulated with signals "a" and "b" which are produced from a low frequency oscillator 35. The signals "a" and "b" have a frequency of 135 Hz, for example, and have a phase difference of 90 degrees therebetween. The outputs from the loop antennas are also applied to polarity controllers 36 and 37 which act to control the polarities of the radio frequency signals by receiving the output from a control signal generator 38. A sense circuit for the initial measurement consisting of a non-directional antenna 39 and a phase shifter 40, which phase shifts the output from the antenna by 90 degrees, produces an output which is applied to a switching circuit 41. The output from the switching circuit 41, the outputs from the modulators 33 and 34, and the outputs from the polarity controllers 36 and 37 are all applied to a combining circuit 42, the output of which is applied to a receiver 43 for amplification and demodulation. The demodulated signal which has a low frequency of 135 Hz, as described above, is applied to a level detector 45 and to a phase detector circuit 46 via a narrow-band filter 44 which allows only signals having the aforesaid frequency to pass therethrough. When the output from the filter exceeds a predetermined level, the level detector 45 produces a signal after a lapse of a short time, for example about 0.5 second, which signal causes the switching circuit 41 to open and starts the control signal generator 38. The phase detector circuit 46 is further supplied with an appropriate low frequency signal having a fixed phase as a phase reference signal from the oscillator 35. The output signal from the phase detector circuit is applied not only to a display device 47, such as a cathode ray tube or digital phase indicator, for displaying or indicating the arriving direction of a wave but also to the signal generator 38.

In the operation of the apparatus of FIG. 2 when the level detector produces no signal, the switching circuit 41 is closed and the signal generator 38 applies inhibiting signal "O" to both polarity controllers 36 and 37 so that these controllers are not operated by the outputs from the loop antennas 31 and 32. In this initial measuring state, when the apparatus is started, the outputs from the loop antennas 31 and 32 are modulated with signals "a" and "b," respectively, in the respective balanced modulators 33 and 34, the two signals being 90 degrees out of phase with each other. Simultaneously, the output from the vertical antenna 39 is applied to the combining circuit 42 via the 90° phase shifter 40 and switching circuit 41. Then, the resultant composite signal is applied to the receiver 43 in which the low frequency component of the output from the oscillator 35 is demodulated, and then noise components are completely removed by the narrow-band filter 44. Thereafter, the output signal from the filter 44 is phase detected in the phase detector circuit 46, thus enabling display of the arriving direction of a wave on the phase display device 47. It will be understood that the operations in this initial measurement are performed in a conventional manner.

After completion of the initial measuring operations, the level detector 45 produces a control signal after a slight delay, as described previously, in order that the switching circuit 41 is opened and the output from the vertical antenna 39 is prevented from sending out any signal to the succeeding stages. At the same time, the output from the detector 45 is applied to the control signal generator 38, whereupon the generator applies one of the two signals to the polarity controllers 36 and 37 according to the output signal from the phase detector 46; that is, the incoming direction of a wave, as shown in the Table below. Specifically, if signal "1" is applied to the controllers 36 and 37, then the generator will send out signals having the same polarity as the outputs from the loop antennas 31 and 32. On the other hand, if signal "−1" is applied, then it will transmit signals having a reversed polarity.

TABLE

| Incoming Direction of Wave | Controller 36 | Controller 37 |
| --- | --- | --- |
| 0–90° | 1 | 1 |
| 90–180° | 1 | −1 |
| 180–270° | −1 | −1 |
| 270–360° | −1 | 1 |

If these controlling relations are maintained, the radio frequency signals sent out from the polarity controllers 36 and 37 are in phase with the signal which has passed through the phase shifter 40 after leaving the vertical antenna 39, independent of the incoming direction of the wave. Therefore, even if reception from the antenna 39 is interrupted after completion of the initial measurement, inputs in phase with the output from the phase shifter 40 can be obtained from the loop antennas 31 and 32. As such, in the final measurement, there arises no necessity of using the vertical antenna 39 whose input phase is adversely affected by disturbances caused by the surrounding and other similar phenomena, thus allowing one to obtain a bearing value having a smaller error.

For example, assume that an error on the order of plus or minus 10 degrees is contained in the initial measurement. Then, if an electromagnetic wave arrives in a direction in the vicinity of any one of 0, 90, 180, and 270 degrees, the polarity controllers 36 and 37 each might receive a wrong signal "1" or "−1" due to such an error. However, this will not affect each phase of the composite signals applied from the polarity controller 36 and 37 to the combining circuit 42, as apparent from the following.

It is now assumed that a wave arrives in an 80° direction but the initially measured value is a 100° direction because of disturbances or the like. If the loop antenna 32 is installed in NS direction and the antenna 31 is installed in EW direction, then the loop antenna 31 is EW direction will take polarity "1," as shown in the Table, whether the incoming direction of the wave is 80° or 100°. If the effective height of each loop antenna and the electric field intensity are denoted by "h" and E, respectively, then the output is given by—

$$\text{Eh sin } 80° = \text{Eh} \times 0.98 \quad (1)$$

If the incoming direction of a wave is 80°, the output from the antenna 32 in NS direction should be given by—

$$\text{Eh cos } 80° = \text{Eh} \times 0.17 \quad (2)$$

If the measured incoming direction is 100° due to measurement error, the output is given by—

$$\text{Eh cos } 100° = -(\text{Eh} \times 0.17) \quad (3)$$

Theoretically, formula (1)+formula (2)=Eh (0.98+0.17)=Eh×1.15 should be obtained; while in the case involving error formula (1)+formula (3)=Eh (0.98−0.17)=Eh×0.81 is obtained in the initial measurement. Thus, it is obvious that a normal phase can be obtained as long as measurement error is not in excess of 45° in the initial measurement.

As will be apparent to one skilled in the art, various modifications can be made within the scope of the aforesaid description. Such modifications being within the ability of one skilled in the art form a part of the present invention and are embraced by the appended claims.

We claim:

1. An automatic direction finder comprising,
   a pair of loop antennas disposed so that their directivities are orthogonal to each other,
   a goniometer including a pair of search coils perpendicular to each other, each search coil producing an output,
   at least one low frequency oscillator for producing a low frequency signal or signals,
   at least one modulator for receiving the low frequency signal or signals from the low frequency oscillator to modulate at least one of the outputs from the search coils,
   a non-directional vertical antenna producing an output,
   a phase shifter for phase shifting the output from the vertical antenna,
   means for combining the modulated signal or signals with the phase shifted signal from the phase shifter,
   means for amplifying and detecting the combined signal, and
   a control circuit for isolating the vertical antenna after completion of the initial measurement of a direction,
   whereby in the initial measurement the loop antennas and the vertical antenna are used and in the final measurement only the loop antennas are used.

2. An automatic direction finder as set forth in claim 1 including a combining circuit; means for connecting said modulator to only one of said search coils which are wound perpendicular to each other in the goniometer and means for connecting the output of the phase shifter for the vertical antenna to the combining circuit in an initial measurement, and thereafter in a final measurement isolating the vertical antenna.

3. An automatic direction finder as set forth in claim 1 further including a pair of polarity controllers disposed between respective one of the loop antennas and the combining circuit, said polarity controllers producing one of the opposite polarities depending on the incoming direction of an electromagnetic wave,
   and wherein said at least one low frequency oscillator is a pair of oscillators producing outputs having a phase difference of 90 degrees therebetween, and wherein said at least one modulator is a pair of modulators disposed between respective one of the loop antennas and the combining circuit, the outputs from the loop antennas being modulated with said outputs from the low frequency oscillators in the respective modulators, whereby in the initial measurement of direction only the output from the phase shifter for the non-directional vertical antenna and the modulated outputs from the modulators are used, after which said phase shifter is isolated and the polarity controllers selectively determine the output polarities of the loop antennas depending on the quadrant of the measured angle in the initial measurement for the final measurement.

4. An automatic direction finder as set forth in claim 1 including a combining circuit; first means for connecting one of said search coils of said goniometer to said combining circuit with the other of said search coils being disconnected in an initial measurement, and second means for connecting the phase shifter for the vertical antenna to said combining circuit during the initial measurement and disconnecting said phase shifter in a final measurement; said first means further including means for connecting the other of said search coils to the combining circuit upon disconnection of said phase shifter.

* * * * *